United States Patent
Li

(10) Patent No.: US 7,382,761 B2
(45) Date of Patent: Jun. 3, 2008

(54) TRANSMISSION METHOD FOR PHYSICAL COMMON PACKET CHANNELS HAVING A POWER BIAS

(75) Inventor: Huajia Li, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 868 days.

(21) Appl. No.: 10/736,279

(22) Filed: Dec. 15, 2003

(65) Prior Publication Data

US 2004/0127227 A1 Jul. 1, 2004

Related U.S. Application Data

(63) Continuation of application No. PCT/CN02/00096, filed on Feb. 20, 2002.

(30) Foreign Application Priority Data

Jul. 20, 2001 (CN) ................................. 01 1 26303

(51) Int. Cl.
*H04B 7/216* (2006.01)
*H04J 13/00* (2006.01)

(52) U.S. Cl. ...................... 370/342; 370/335; 370/441; 370/479

(58) Field of Classification Search ..................... None
See application file for complete search history.

(56) References Cited

U.S. PATENT DOCUMENTS 6,181,683 B1 1/2001 Chevillat et al.
6,219,343 B1 4/2001 Honkasalo et al.

OTHER PUBLICATIONS

Lin, Error Control Coding, 1983, Prentice-Hall, p. 10-11.*

* cited by examiner

*Primary Examiner*—Ronald Abelson
(74) *Attorney, Agent, or Firm*—Hamre, Schumann, Mueller & Larson, P.C.

(57) ABSTRACT

A transmission method for the physical common packet channels having the power bias is disclosed in the invention. The power bias magnitudes are added in the physical common channels of the said transmission method between the last successfully accessed access prefix and the conflict detection prefix, between the access prefix and the power control prefix, and between the power control prefix and the control section of the messages. By utilizing the method of the invention, the access probability in the transmission procedure of the physical common packet channels can be increased, the average access time can be shortened, the interference with the other users can be reduced, and the comprehensive performance of the link can be improved.

3 Claims, 1 Drawing Sheet

Prior Art

TRANSMISSION METHOD FOR PHYSICAL COMMON PACKET CHANNELS HAVING A POWER BIAS

FIELD OF THE INVENTION

The present invention relates to mobile communication systems, more particularly, relates to a channel transmission method for physical common packet channels having power bias in the wide-band code division multiple access communication systems.

BACKGROUND OF THE INVENTION

In the physical common packet channels of the wide-band code division multiple access, a physical common packet channel is composed of an access prefix (AP), a conflict detection prefix (CD_P), a power control prefix (PCP), and the messages. The power transmitted by the access prefix is a climbing procedure: an initial access prefix is started to transmit by using an evaluated value of an open loop power, if the down-link acknowledgement information is not received, then the access prefix will be transmitted continuously by using the power bias of $\Delta$ P0. When the down-link acknowledgement information is received, then the conflict detection prefix will be transmitted by using the same power, after the acknowledgement information being received, the power control prefix and the messages will be transmitted by using the power bias of $\Delta$ Pp-m corresponding to the conflict detection prefix. An illustration diagram of the whole procedure is shown in FIG. 1.

Because the main function of the access prefix is used to determine an approximately suitable transmission power value, so the acquisition probability of which is not high under the power level of an access prefix which is the last one acquired successfully by the base station. However, the function of the conflict detection prefix is used to detect the conflict. Under the condition of a reasonable cost, the acquisition probability should be as high as possible. If the conflict detection prefixes are transmitted by the same power, then it will cause not only no conflict, but also no conflict detection prefix being able to be detected. Thus, this access procedure shall be restarted with a high cost. A method used presently is to increase the climbing steps of the access prefix, then the average power level and the acquisition probability of the access prefix, which is the last one acquired successfully, can be increased. The disadvantage thereof is the fluctuation of the power level (or the signal to noise ratio) of the access prefix, which is the last one accessed successfully, is large, so the object of the power control for making the access prefix climbing cannot be reached. However, the improvement of the acquisition performance of the conflict detection prefix is limited.

Power control prefixes subsequent to the conflict detection prefix are used to control the power, it can be seen from the above description, only an approximate power control can be obtained by using the climbing of the access prefix, this precision is not sufficient for demodulating the messages. Thus, the power control will be controlled by the power control prefixes to achieve a better power control result of the messages at the end of the power control prefix. The power control effect of the power control by using the power control prefix corresponds directly to the magnitude of the power of the power control prefix. If the power of the power control prefix is large, then the SIR evaluation of the base station will be more accurate, and the power control of the power control prefix will be more accurate. In contrast, the smaller the power of the power control prefix is, the more inaccurate the SIR evaluation of the base station is, and the worse the effect of the power control by using power control prefix will be. However, the power of the power control prefix cannot be increased limitlessly, because the increase of the power will cause the overhead and the interference with the other users. Thus, there is an optimum power bias value between the power of the power control prefix and the access prefix, which is the last one accessed successfully.

The demodulated power value of the subsequent messages is determined by the demodulation performance that the messages can reach, it is related to the frequency spread factor, encoding, and the channels of the messages, and the like. Normally, the value of which is different from the optimum power value of the power control prefix. Thus, there exists a power difference between the power control prefix and the control section of the messages. However, this power difference does not exist in the present physical common packet channels, thus, it is difficult to achieve the optimum comprehensive performance of the whole link.

SUMMARY OF THE INVENTION

The object of the invention is to provide a transmission method for the physical common packet channels having power bias aiming at the disadvantages, such as the successful probability of the access probability being low, the interference with the other users being large, and the comprehensive performance of the link being worse, existing in the transmission procedure of the present wide-band code division multiple access physical common packet channels, and by utilizing the said method, the successful access probability of the physical common packet channels in the transmission procedure may be improved by the power bias, the interference with the other uses can be reduced, and the comprehensive performance of the whole link can be improved.

In order to realize the above object, the following technical scheme is used in the invention: the transmission method for the physical common packet channels having the power bias of the invention is that in the access procedure for transmitting the code division multiple access physical common packet channels, when an acquisition indication for the access prefix transmitted by the user equipment has been indicated by the base station in the down-link channel, a conflict detection prefix will be transmitted by the user equipment to the base station by first power having a first power bias magnitude $\Delta$ Pa-c with the power of the access prefix which is the last one access successfully.

After the acquisition acknowledgment for the conflict detection prefix being received by the base station, the first time slot of the power control prefix will be transmitted by the user equipment by a second power having a second power bias magnitude $\Delta$ Pa-p with the power of the access prefix of the last successful access, the time slots subsequent to the first time slot are power adjusted based on the closed loop power control.

After ending the transmission of the time slot of the last power control prefix by the user equipment, the control section and data section in the information section will be transmitted to the base station by a third power having a third power bias magnitude $\Delta$ Pp-m with the power of the time slot of the last power control prefix.

When the power control prefixes are not transmitted by the user equipment, or the number of the power control prefixes is zero, transmitted by the control section of the information section is the power having a power bias magnitude of the sum of the two bias magnitudes Δ Pa-p and Δ Pp-m, based on the power the access prefix which is the last one accessed successfully.

DETAILED DESCRIPTION OF THE PREFERRED EMBODIMENTS

Figure 1:
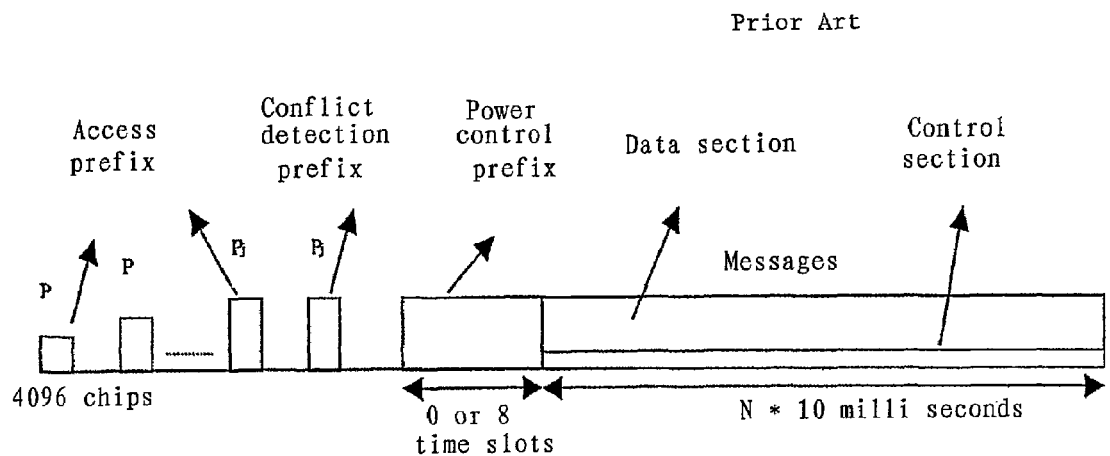
FIG. 1 is an illustration diagram of a physical common packet channel transmission procedure in the code division multiple access communication system used currently.
Figure 2:
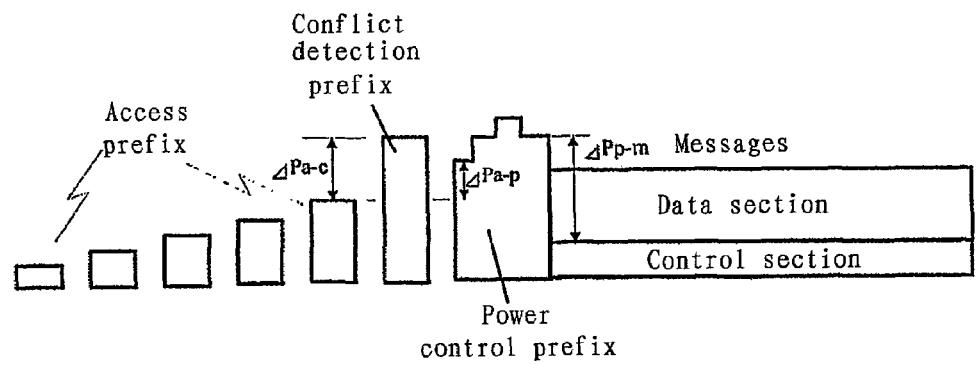
FIG. 2 is an illustration diagram of a transmission procedure for a physical common packet channel having power bias in the code division multiple access communication system used by the invention.

Please refer to FIG. 2. The method conception of the invention is: in the physical common channels, the power bias magnitudes are added between the access prefix (AP), which is the last one accessed successfully, and the conflict detection prefix (CD_P), between the access prefix (AP) and the power control prefix (PCP), and between the power control prefix (PCP) and the control section of the messages. The power of the access prefix, which is the last one accessed successfully, is used as a reference to define the power bias magnitude of the conflict detection prefix as Δ Pa-c and to define the power bias magnitude of the first time slot of the power control prefix as Δ Pa-p, the subsequent time slots after the first time slot is adjusted based on the power control, and the power bias magnitude between the control section of the messages and the time slot of the last power control prefix is defined as Δ Pp-m.

Based on the above conception and definition, the transmission method for the physical common packet channels having the power bias in the invention is: in the access procedure of the transmission of the code division multiple access physical common packet channels, after an acquisition indication in the down-link physical common packet channels is indicated by the base station for the access prefix transmitted by the user equipment, the conflict detection prefix is transmitted by the user equipment to the base station by using a power bias magnitude Δ Pa-c corresponding to the access prefix which is the last one accessed successfully.

After the acquisition acknowledgement for the conflict detection prefix being received by the base station, the first time slot of the power control prefix may be transmitted by the user equipment by using another power bias magnitude of Δ Pa-p corresponding to the access prefix of the last successful access, the time slots subsequent to the first time slot are power adjusted based on the closed-loop power control.

After ending the transmission of the time slot of the last power control prefix by the user equipment, the control section and data section in the information section will be transmitted to the base station by using a further power bias magnitude of Δ Pp-m of the time slot of the last power control prefix.

When the power control prefixes are not transmitted by the user equipment, or the number of the power control prefixes is zero, the power transmitted by the control section of the information section is the power applying a power bias magnitude of the sum of the two bias magnitudes Δ Pa-p and Δ Pp-m, based on the power of the access prefix which is the last one accessed successfully.

INDUSTRIAL APPLICABILITY

Because the above transmission method for the physical common packet channels having the power bias is used in the invention, the signal transmission in the physical common packet channels has the following advantages:

1) The probability of the successful access can be increased and the average time for accessing successfully can be shortened. The condition of the conflict detection prefix with low access probability can be prevented by having a power bias magnitude of Δ Pa-c of the access prefix of the last successful access and the conflict detection prefix, and the access probability of the conflict detection prefix can be improved.

2) The interference with the other users can be reduced, a smaller value can be taken as the climbing steps Δ P0 of the access prefix, and the power of the last access prefix accessed successfully by the user will be more stable, that is, a better power control effect can be reached, thereby the interference with the other users will be small.

3) The power control effect of the power control prefix can be improved, and the demodulation performance of the messages can be enhanced. The power control prefix and the control section of the messages have the different power biases. Thus, the power control function of the power control prefix can be brought into full play, and the demodulation performance of the messages can be enhanced, and the power control effect of the power control prefix can be increased, thereby the comprehensive performance of the whole link can be improved.

What is claimed is:

1. A method for transmitting physical common packet channels having power bias, comprising:
   transmitting code division multiple access physical common packet channels;
   indicating an acquisition in a down-link physical common packet channel by a base station for an access prefix transmitted by user equipment; and
   transmitting conflict detection prefix by the user equipment to the base station by first power having a first power bias magnitude ΔPa-c with power of the access prefix which is a last one accessed successfully;
   receiving acquisition acknowledgement for the conflict detection prefix by the base station; and
   transmitting a first time slot of a power control prefix by the user equipment by a second power having a second power bias magnitude ΔPa-p with power of the access prefix of a last successful access, time slots subsequent to the first time slot being power adjusted based on a closed-loop power control.

2. The method of claim 1, further comprising:
   after ending transmission of time slot of a last power control prefix by the user equipment, transmitting a control section and a data section in information section to the base station by a third power having a third power bias magnitude Δ Pp-m with power of the time slot of the last power control prefix.

3. The method of claim 2, wherein, when the power control prefixes are not transmitted by the user equipment, or the number of the power control prefixes is zero, power transmitted by the control section of the information section is power having a power bias magnitude of the sum of the two bias magnitudes Δ Pa-p and Δ Pp-m, based on power of the access prefix which is the last one accessed successfully.

* * * * *